Figure 1:
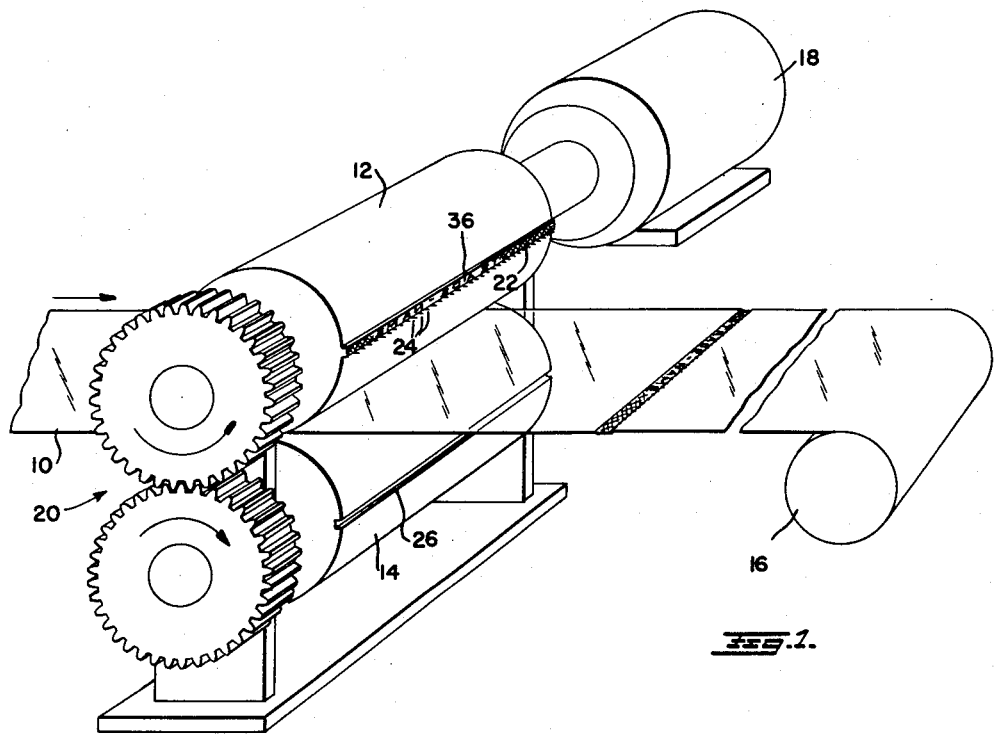

Jan. 9, 1962     O. B. POLLOCK     3,016,137
PLASTIC FILM ROLL SYSTEM

Filed Nov. 6, 1957

INVENTOR
Orthello B. Pollock
by his attorneys
Glenn & Jackson

United States Patent Office 3,016,137
Patented Jan. 9, 1962

3,016,137
PLASTIC FILM ROLL SYSTEM
Orthello B. Pollock, Henrico County, Va., assignor to Reynolds Metals Company, Richmond, Va., a corporation of Delaware
Filed Nov. 6, 1957, Ser. No. 694,833
4 Claims. (Cl. 206—58)

This invention relates to means for facilitating the successive withdrawal of portions of clear plastic film from a ro'l of film, and has particular application to roll film sold for use in kitchens and the like.

Rolls of clear plastic film have long been sold for kitchen and household use, and these rolls have usually been so'd in boxes provided with a cutting edge along one side of the box to facilitate detaching portions of the film from the roll. It has been found in practice that the severed leading edge of the roll tends to wrap around the roll and become difficult to locate and lift up preliminary to cutting another section from the roll. The fi'm usually has an electrostatic charge on it to cause it to cling around articles to be wrapped in the film, and this characteristic, coupled with the clarity of the film, makes it much more difficult to unwrap rolls of clear plastic film than in the case of other wrapping materials. The primary purpose of the present invention is to overcome this difficulty and make it easy to detach successive pieces from a rol' of clear plastic film. Moreover, the invention makes it possible, where desired, to dispense with the conventional cutting edge and to detach the film in successive measured pieces of a predetermined useful rectangular shape.

Figure 2:
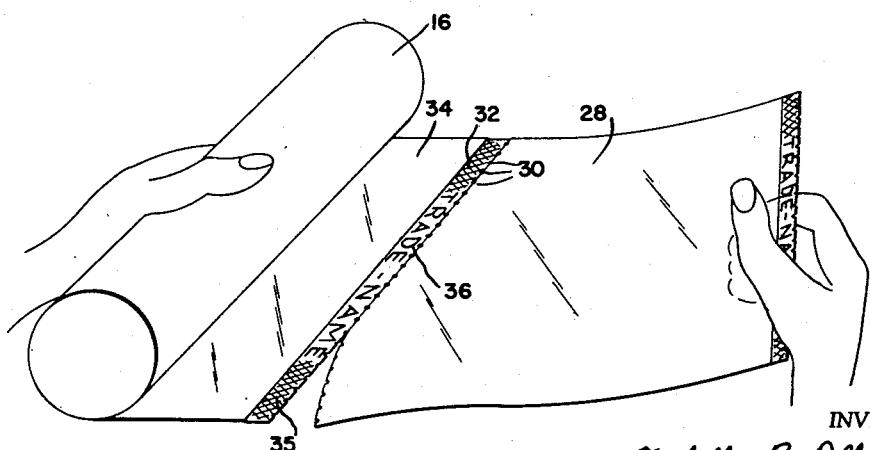

For a better understanding of the invention, reference is now made to the present preferred embodiment of the invention shown, for purposes of illustration only, in the accompanying drawing. In the drawing:

FIG. 1 shows a semi-diagrammatic perspective view of apparatus for embossing and perforating clear plastic film in accordance with the invention; and FIG. 2 shows a ro'l of film which has been embossed and perforated in accordance with the invention, and a portion of the film being detached from the roll.

Referring now more particularly to the drawing, and initial'y to FIG. 1, there is shown a strip of clear plastic film 10 being fed continuously between a pair of embossing rolls 12 and 14 and then wound up into a roll 16 (in practice, this procedure may be varied to wind the fi'm on a large roll, from which it is subsequently rewound onto smaller retail-size rolls; in that case, the film 10 would be passed between rolls 12 and 14 in the opposite direction from that shown in FIG. 1). A motor 18 drives the roll 12, and a chain drive 20 positively drives the roll 14 from the roll 12 at the same speed rotation. The roll 12 is of steel and has a male embossing element 22 extending across the outside of the roll parallel to its axis of rotation. A series of spaced cutting edges 24 are mounted on the roll 12 adjacent and along one side of the embossing element 22, for the purpose of perforating the film 10. The roll 14 has a female embossing element 26 positioned to cooperate with the male element 22, and has surfaces which cooperate with the cutting edges 24 to perforate the film 10.

As shown in FIG. 2, when the roll 16 is unwound, the leading portion 28 may be torn away along the perforation 30 formed by the edges 24. The positions of the embossing elements 22 and 26 re'ative to the cutting edges 24 is such that the perforations 30 are immediately ahead of the embossed area 32 where the successive portions of the film 10 are separated by the embossed areas 32 and perforations 30. Consequently, when the next succeeding portion 34 of the roll 16 is again wrapped around the roll 16, the embossed area 32 (preferably in a grid-like pattern) stands out to make the leading edge of the film, and to facilitate lifting it away to resume unwinding the roll 16.

An added advantage of the invention is in embossing a trade name or trade mark 36 along the embossed area 32. Letters 38 formed as part of the embossing elements 22 and 26 have the effect of pressing and distorting this film strongly enough to cause it to whiten appreciably, and consequently the trade name or trade mark 36 on the final roll 16 is clearly legib'e to serve as an advertising medium, as well as an indicator of where the leading edge of the film may be found.

As can be seen from inspection of FIG. 2, it is not necessary to have any cutting edge on the box in which the roll is sold to aid in separating the successive portions of the film. In fact, it is not necessary to have a rigid container for the roll, since no mounting for a cutting edge is required. However, the roll 16 may be placed in a box, and may be unwound from the box and held there while the successive portions are removed, when so desired.

The film may be of any clear plastic material, such as vinyl chloride, a copolymer of vinyl chloride and vinylidene chloride, polyethylene, cellophane, or other known plastic films or equivalent material in the form of clear thin strips.

While I have illustrated and described a present preferred embodiment of the invention, it will be understood that the invention is not limited thereto, but may be variously embodied and practiced within the limits of the fol'owing claims.

I claim:

1. A roll of clear plastic film wound with the adjacent convolutions in direct surface contact with each other, the said fi'm exhibiting a tendency for adjacent layers thereof to cling together, and means to facilitate detachment of successive predetermined sections of the film, said means comprising uniformly spaced lines of perforations through the film, each extending transversely across the width of the film, and corresponding spaced narrow lengths of embossed areas of the film disposed immediately adjacent the respective lines of perforations on that side of each perforation furthest from the leading edge of the rolled fi'm, whereby the film is readily tearable along each line of perforations, leaving an embossed area on the new leading end of the film to facilitate locating and lifting the said new leading end of the film from the roll.

2. A roll of c'ear plastic film wound with the adjacent convolutions in direct surface contact with each other, the said film exhibiting a tendency for adjacent layers thereof to cling together, and means to facilitate detachment of successive similar sections of the film, said means comprising an embossed area adjoining the leading end of each section, and a line of perforations through the film extending transversely of the film width at the trailing end of each section, the line of perforations of one section lying immediately adjacent the embossed area of the succeeding section, and at least part of the embossing being in the form of visible lettering.

3. A roll of clear plastic film wound with the adjacent convolutions in direct surface contact with each other, the said film exhibiting a tendency for adjacent layers thereof to cling together, and integral means to facilitate detachment of successive predetermined sections of the film, said means comprising a narrow area adjoining the leading end of each section, said area being embossed in a grid-like pattern, and a line of perforations through the film, extending transversely of the film width, and defining the trailing end of each section, whereby the film is readily tearable along each line of perforations, leaving a readily visible embossed area on the new leading end of the film which will cling less tenaciously to the underlying layer of film, said embossed area thereby serving as a convenient locating and lifting means for the said new leading end of the film.

4. A roll of clear plastic film wound with the adjacent convolutions in direct surface contact with each other, the said film exhibiting a tendency for adjacent smooth layers thereof to cling together, means embodied in said film and constituting an inseparable portion thereof to facilitate detachment of successive similar sections of the film, said means comprising a narrow embossed area adjoining the leading end of each section and a line of perforations through the film, extending transversely of the film width, and defining the trailing end of each section, the line of perforations of one section lying immediately adjacent the embossed area of the succeeding section, whereby the film is readily tearable along each line of perforations, and each leading end of a film section is readily located and separated from the underlying layer of film.

References Cited in the file of this patent

UNITED STATES PATENTS

| | | |
|---|---|---|
| 272,369 | Wheeler | Feb. 13, 1883 |
| 1,102,203 | Scott | June 30, 1914 |
| 1,529,500 | Osborne | Mar. 10, 1925 |
| 2,126,777 | Holt | Aug. 16, 1938 |
| 2,127,246 | Christman | Aug. 16, 1938 |
| 2,139,041 | Salfisberg | Dec. 6, 1938 |
| 2,195,740 | Salfisberg | Apr. 2, 1940 |
| 2,202,110 | Maurer | May 28, 1940 |
| 2,526,469 | Garlough | Oct. 17, 1950 |
| 2,612,992 | Tinkham | Oct. 7, 1952 |
| 2,857,047 | Edelson | Oct. 21, 1958 |
| 2,890,822 | Lee et al. | June 16, 1959 |